Oct. 28, 1958 E. F. WERNDL 2,857,767
FRICTIONLESS FREE GYROSCOPE
Filed March 5, 1956 2 Sheets-Sheet 2

INVENTOR.
ERNST F. WERNDL
BY
Kenyon & Kenyon
ATTORNEYS

United States Patent Office 2,857,767
Patented Oct. 28, 1958

2,857,767
FRICTIONLESS FREE GYROSCOPE

Ernst F. Werndl, New York, N. Y., assignor to Bulova Research and Development Laboratories, Inc., Woodside, Long Island, N. Y., a corporation of New York Application March 5, 1956, Serial No. 569,365

6 Claims. (Cl. 74—5.37)

This invention relates generally to gyroscopic apparatus and more particularly to free gyroscopes of the type wherein the spining axis of the gyro serves as a datum line for indicating the absolute angular displacement of the supporting base.

The conventional free gyroscope is constituted by a rotor in the form of a flywheel mounted for rotation in mechanical bearings, the rotor being suspended in two or more gimbals whereby the rotor is also free to oscillate about two other axes through the center of gravity of the system. The axes of the gimbals are mutually perpendicular and also perpendicular to the rotor axis.

Inertia and precession are the fundamental properties of a gyroscope. When the rotor is spinning, the axle thereof opposes a greater resistance to external forces tending to change its direction in space. It is this inherent rigidity of a spinning gyro which is characterized as inertia. If a torque is applied to the rotor through the gimbal and rotor axle bearings such as to shift the plane of spin of the rotor, or the direction of the rotor axle, the axle will precess in a plane normal to the planes of spin and of the applied torque.

In gyroscopes of standard design the surrounding frame which rotatably supports the rotor is in turn given freedom to oscillate about an axis perpendicular to the spin axis, this being accomplished by additional mechanical bearings or by floating the frame in a fluid. In the latter instance, the frame is constructed as a floating sphere rotatable in a fluid which is at rest. Existing gyroscopes generally take the form of an electric motor and the energy necessary to initiate and maintain the spin of the motor is fed thereto through slip rings or flexible wires. Such electrical coupling means interfere with the freedom oft he gyro and exert disturbing forces thereon, as a result of which the gyro is caused to precess, though slowly, in an unpredictable manner. Another factor militating against gyro freedom and giving rise to undesirable precession is the friction in the rotor bearings. By reason of these disturbances, the gyro in time drifts away from its initial orientation and becomes useless for its intended purpose.

In view of the foregoing, it is the principal object of the present invention to surmount the above-mentioned drawbacks of conventional structures and to provide an improved gyroscope which is substantially frictionless and free of disturbing forces either in spinning or precessing.

More specifically it is an object of the invention to provide a gyroscope wherein the rotor is floated in a liquid which, during normal operation, spins with the rotor. As previously indicated, in liquid float arrangements of the type heretofore known, a gyrosphere is rotatable in a fluid which is at rest. In contradistinction thereto, no relative motion exists between the liquid and the floating rotor in a gyroscope according to the present invention. A significant advantage of this fluid coupling arrangement is that the angular momentum of the gyro is conserved indefinitely without loss to surrounding parts, and no energy has to be supplied to the gyro itself to maintain its spin.

Also an object of the invention is to provide a gyroscope in which the rotor is floated within a vessel whose orientation relative to the rotor is automatically adjusted by a servo-mechanism controlled preferably by optical detection means responsive to said orientation but having no mechanical reaction on the gyro. In this manner the gyro is isolated from all external disturbances and may maintain a constant direction for protracted periods.

An important feature of the frictionless gyro construction in accordance with the invention is that it is possible to make an efficient and reliable gyroscope of relatively small size and of simple construction. In practice, the gyro size may be no greater than that of an apple or orange.

Briefly stated, in a frictionless gyroscope according to the invention, the rotor is constituted by a hollow mass, preferably spherical in form, which is floated in a hermetically sealed vessel filled with a liquid whose density exceeds the mean density of the rotor, thereby rendering the rotor buoyant. The vessel is supported within a gimbal system such that the vessel maintains its position in spit of roll, pitch or azimuthal movement of the support. The vessel is set into motion by a motor whereby the fluid and the gyro rotor floated therein is also caused to rotate synchronously with the vessel and without relative motion therebetween. Means mechanically independent of the rotor are provided to detect the angular displacement of the rotor axis relative to the vessel and to produce a signal whose phase and magnitude is a function of said displacement. The signal controls a servo-mechanism automatically operating on said gimbal system so as to re-align said vessel axially with said rotor.

For a better understanding of the invention, as well as other objects and further features thereof, reference is made to the following detailed description to be read in conjunction with the accompanying drawing, wherein like components in the several figures are identified by like reference numerals.

Figure 1:
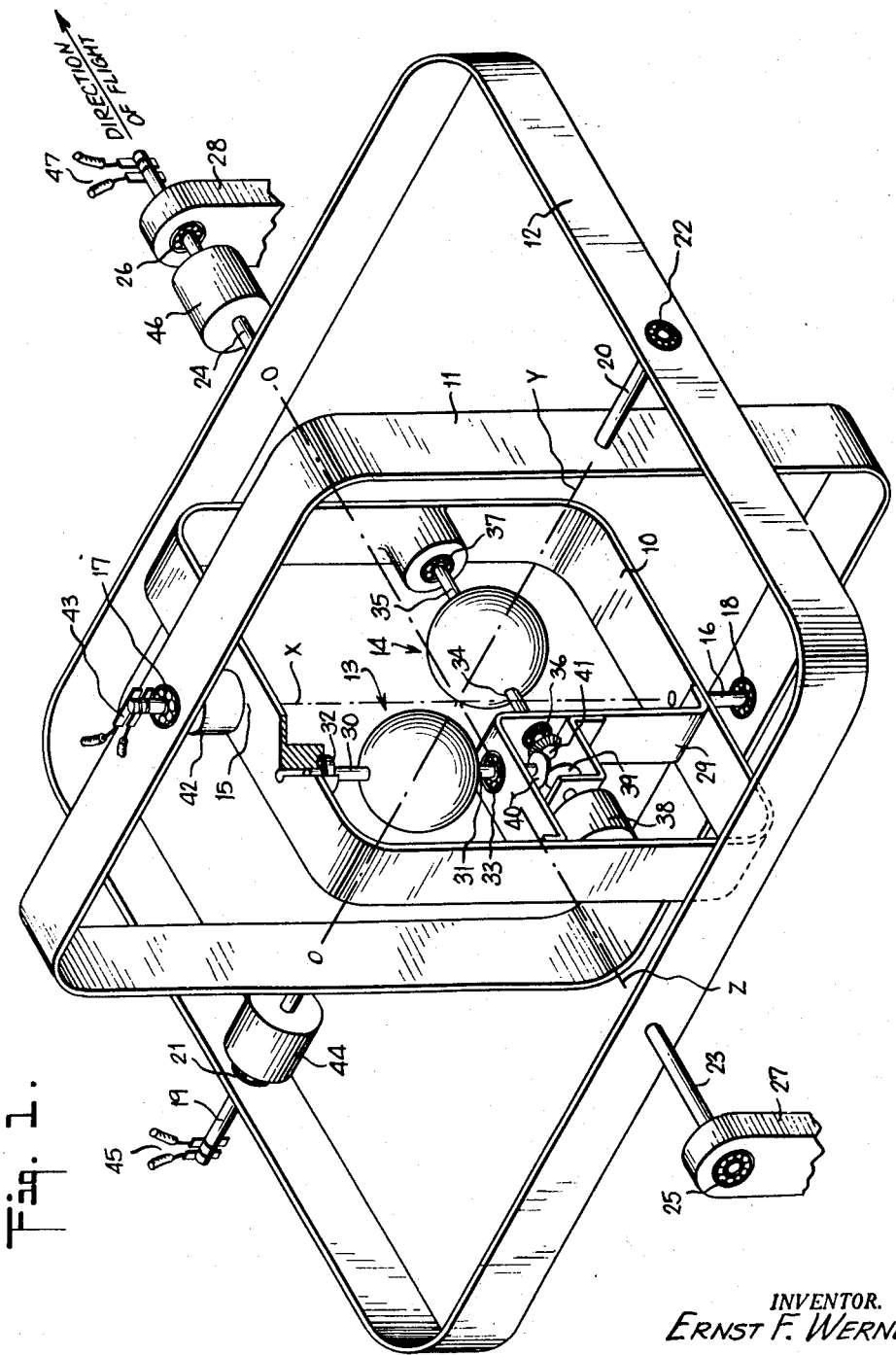
Fig. 1 shows, in perspective, gyrosphere structures in accordance with the invention mounted with a gimbal system whose orientation is automatically controlled.

Referring now to the drawings, and more particularly to Fig. 1, the gyroscope in accordance with the invention comprises a rectangular azimuth frame or platform 10, an inner or pitch gimbal 11, and an outer or roll gimbal 12. Supported rotatably within platform 10 is a vertical position therein is a pitch and roll-responsive gyrosphere 13, and rotatably supported in a horizontal position therein is a pitch and yaw-responsive gyrosphere 14.

Platform 10 and inner gimbal 11 lie within mutually perpendicular planes, whereas outer gimbal 12 lies in a plane intersecting the center of both platform 10 and inner gimbal 11 and perpendicular to the planes thereof. Platform 10 is pivotally supported about an axis X within inner gimbal 11 by means of trunnions 15 and 16, journalled within ball bearings 17 and 18, respectively, affixed to opposing arms of the inner gimbal. Inner gimbal 11 is pivotally supported within outer gimbal 12 about an axis Y by means of trunnions 19 and 20 journalled in bearings 21 and 22 secured to opposing arms of the outer gimbal. Outer gimbal 12 is pivotally supported about an axis Z by means of trunnions 23 and 24 journalled in bearings 25 and 26 mounted in upright standards 27 and 28 attached to the base of the gyroscope. The axes X, Y and Z are mutually perpendicular, whereby the gyrospheres may be oscillated in three dimensions.

The gyrospheres 13 and 14 are mounted within platform 10 on a right angle bracket 29 connected to adjacent arms of the platform at one corner thereof. Gyrosphere 14 is rotatably mounted by means of trunnions 34 and 35, journalled in bearings 36 and 37 secured to the side arm of bracket 29 and the side wall of the platform parallel thereto. Thus the axis of rotation of the roll and pitch-responsive gyrosphere 13 is normal to that of the pitch and yaw-responsive gyrosphere 14.

An electric motor 38 is fixedly mounted within bracket 29 and is geared to drive both of the gyrospheres uniformly at high speed. Motor 38 is provided with a bevel gear 39 attached to the armature shaft thereof and intermeshing with a bevel gear 40 keyed to trunnion 31 of gyrosphere 13. Gear 40 in turn is coupled to a gear 41 keyed to trunnion 34 of the gyrosphere 14. Thus when motor 38 is energized, gyrospheres 13 and 14 are caused simultaneously to rotate.

The angular position of platform 10 about axis X is controlled by means of a servomotor 42 mounted on trunnion 15 and energized through slip rings 43. A servomotor 44 mounted on trunnion 19 is adapted to control the angular position of inner gimbal 11 about axis Y, and is energized through slip rings 45. The angular position of outer gimbal 12 about axis Z is controlled by a servomotor 46 mounted on trunnion 24 and energized through slip rings 47. As will be explained more fully in connection with Figs. 2 and 3, servomotors are connected to servo systems which are governed by optical detectors responsive to the angular displacement of the rotor within the gyrospheres so as automatically to cause the servomotors to adjust the angular position of the gimbal system in a direction and to an extent restoring the gyrospheres to their proper axial position.

Figure 2:
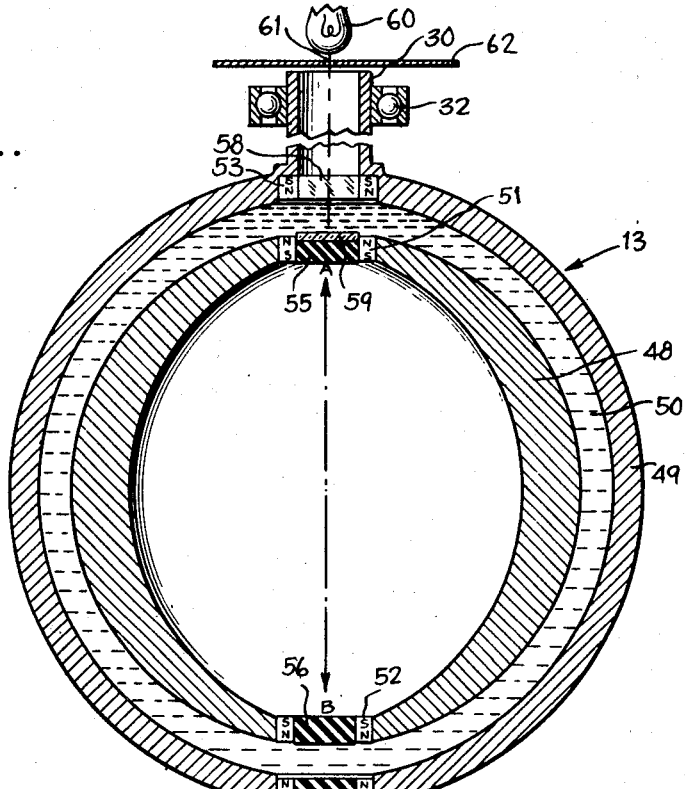
Fig. 2 is a longitudinal section taken through a preferred embodiment of one gyrosphere in accordance with the invention, the gimbal system being omitted in this view for purposes of clarity.

Gyrospheres 13 and 14 are identical in structure, hence for purposes of simplicity, only gyrosphere 13 will be considered in connection with Fig. 2. The gyrosphere 13 in accordance with the invention is constituted by a rotor element 48, floatably supported within a sealed vessel or casing 49 from which project at diametrically opposed positions the trunnions 30 and 31. These trunnions are of hollow construction and serve, as pointed out in Fig. 1, to mount the sphere for rotation within the platform 10, the gyrosphere being driven at high speed by motor 38 operatively coupled via gears 39 and 40 to the lower trunnion 31. The axis of rotation is indicated in the drawing by line A—B.

The inner wall of vessel 49 is a surface of rotation, preferably spherical, and the outer surface may have a corresponding form. The invention however is not limited to a spherical form for the vessel and any other symmetrical construction giving freedom of movement to the rotor may be employed. The rotor 48 is preferably constituted by a hollow, hermetically-sealed sphere whose outer diameter is smaller than the inner diameter of casing 49 to define a spacing therebetween. This space is filled with a liquid 50 whose density is slightly higher than the mean density of the hollow rotor to impart buoyancy to the rotor. In practice the liquid may be composed of distilled water and glycerine with the addition of a small quantity of salicylic acid in such proportions as to provide a specific gravity sufficient to float the rotor. Obviously, many other liquid compositions such as silicon oil are suitable for this purpose. The liquid as well may have a high density.

To compensate for ambient temperature variations the rotor sphere may be provided with diaphragms or other means to adjust the volume thereof in a direction compensating for said variations. Alternatively, the gyroscope may be housed in a temperature-controlled chamber. For purpose of clarity, the spacing between the rotor and the casing is exaggerated in the drawing, but in practice this spacing may be quite narrow.

Since the hollow rotor 48 has a mean density slightly less than the surrounding liquid, it has a small positive buoyancy, hence when the combination of casing and rotor is set into rotation about axis A—B, the resultant of the centrifugal forces will center the rotor equatorially on that axis, but the rotor will be free to move in the axial direction. For centering the rotor within axis A—B and to prevent the rotor from physically contacting the inner surface of the casing, two annular permanent magnets 51 and 52 are disposed at opposing poles of the rotor sphere and two similar permanent magnets 53 and 54 are fixed at opposing positions on the axis of casing 49. Magnets 51 and 53 and magnets 52 and 54 are arranged with their like magnetic poles facing each other, as indicated by the north and south symbols in Fig. 2, whereby the magnets are in repelling relationship. This produces a centering action along axis A—B tending to maintain the rotor out of contact with the inner wall of the casing.

Now the floating sphere, having its highest momentum in the plane of the equatorial ring, will act as a free suspended gyro without friction. It will tend to maintain its position in space regardless of any tilting of the outside driving vessel. It is to be understood that this centering action may also be obtained by electromagnetic or electrodynamic means on the casing in lieu of permanent magnets.

To seal the hollow rotor 48 and prevent leakage of fluid therein, a non-magnetic plug 55 is inserted in the hollow of magnets 51, and a similar plug 56 is inserted in magnet 52. Likewise, to seal the casing 49, a non-magnetic plug 57 is inserted in magnet 54, whereas magnet 53 is enclosed by a transparent glass window disc 58.

In order that rotor 48 may spin stably about axis A—B, its moment of inertia around the axis must be greater than that about any other axis. As shown in the drawing, this is achieved by making the wall thickness of the rotor greatest at the equator, the thickness tapering off towards the poles to provide an equatorial concentration of mass. It will be obvious, however, that many other configurations may be used to fulfill the same condition. For example, the floatable rotor may be constituted by a hollow cylinder having a saturn ring about its equatorial portion, or the rotor may be formed by a double cone or any other mass symmetrical with respect to the spin axis and having mirror symmetry.

To detect the angular position of rotor 48 relative to casing 49 both with respect to roll and pitch, a small plane mirror 59 is attached to the outer surface of the plug 55 enclosing the rotor, the mirror face being visible through hollow trunnion 30 and the glass window 58 in magnet 53. Light from a lamp 60 or a similar source is projected in axial alignment with trunnion 30, and rays therefrom are directed through a central aperture 61 in a photosensitive detector 62 toward mirror 59, the rays being reflected thereby onto the detector. When the rotor is in axial alignment with the casing, the angle of incidence will be coincident with the angle of reflection, but when the rotor departs from alignment, a corresponding deviation is effected in the angle of ray reflection.

Figure 3:
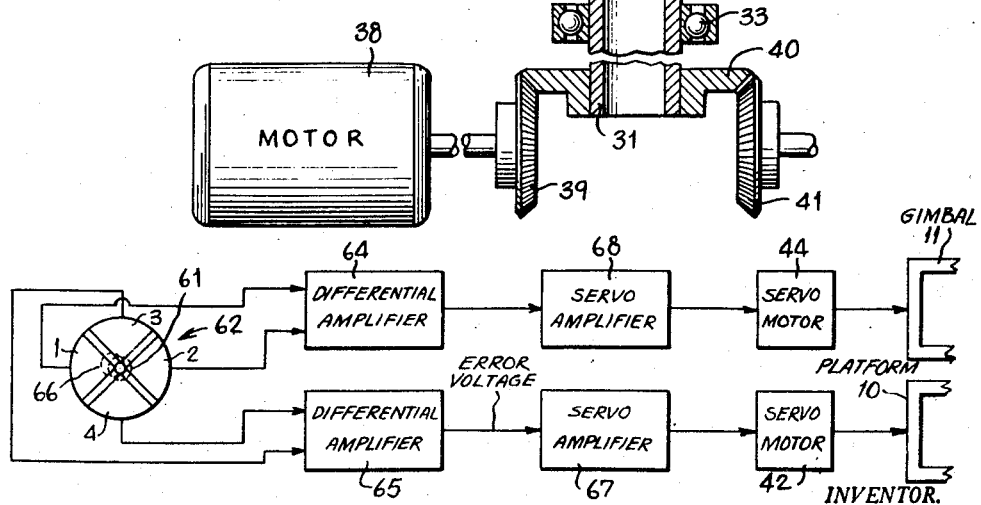
Fig. 3 is a schematic diagram illustrative of the automatic control mechanism for the gimbal system.

Detector 62, as will now be explained more fully in connection with Fig. 3, is composed of four quadrantal photosensitive sections 1, 2, 3 and 4. These sections may be constituted by photovoltaic or photoelectric elements in conjunction with suitable masks or apertures. Since the gyrosphere is mounted in gimbals which allow the outer vessel to be tilted about axes at right angles to each other, if the inner rotor and the outer vessel are in axial alignment, the light reflected by mirror 59 will fall equally on all sections 1, 2, 3 and 4 as indicated in the drawing by the circle. But a small angular displacement between rotor and casing will cause asymmetrical illumination of the sections, and the resultant photocurrent, when suitably amplified, may be employed as a signal controlling a servo system to bring the outer vessel into line with the inner rotor.

This is accomplished by connecting horizontally-opposed photocell sections 1 and 2 to the input of a differential amplifier 64 and vertically opposed sections 3 and 4 to the input of another differential amplifier 65. Thus in the situation where the light beam falls equally on all sections, a substantially identical output is yielded thereby, as a result of which no output is produced in either of the differential amplifiers.

Let us now assume an angular displacement of the rotor giving rise to an unequal illumination of the sectors, as indicated by the eccentrically disposed circle 66. The relative illumination of sections 3 and 4 indicates the extent of deviation off axis in the horizontal plane and this is reflected in the phase and magnitude of the error voltage developed by differential amplifier 65. This error voltage is applied to a servo amplifier 67 of suitable design whose output is applied to servomotor 42 acting to shift platform 10 in a direction and to an extent restoring the beam to its center position with respect to the horizontal.

The relative illumination of sections 1 and 2 indicates the degree of deviation off axis in the vertical plane and this is reflected in the phase and magnitude of the error voltage developed by differential amplifier 64. This voltage is applied to a servo amplifier 68 whose output is fed to servomotor 44 serving to shift gimbal 11 in a direction and to an extent restoring the beam to its center position with respect to the vertical. Thus the combined action of the four photocells acts automatically to re-align the outer sphere of the gyrosphere with the inner rotor.

A similar negative feedback arrangement, but involving only two photocell sections may be used in conjunction with gyrosphere 14 and servomotor 46. In this way the platform may be precisely stabilized, virtually without friction losses.

In place of a four sector optical detector, two photo elements only may be used if these elements are slowly rotated about the axis in connection with a four-fold commutator. This method has the advantage that the cells need not be accurately balanced. In place of photocells, use may be made of electrodynamic, electrostatic or other known means to detect the angular displacement of the rotor relative to the outer sphere.

Before the apparatus is put to work, the rotor 48 may be in any position, generally touching one side of the outer casing 49. When casing 49 is set into rotation by motor 38, it will initiate rotation of liquid 50 in the same direction. This in turn will engender rotation of rotor 48 about axis A—B. As this rotation continues, even if the servomotors are not energized, rotor 48 will erect itself for two reasons. First, the dynamic forces will urge it to spin around the axis marked by the magnets. Second, if this axis does not coincide with the axis of spin of the liquid, there will be a component of the viscosity torque at right angles to the magnetic axis, causing precession in a direction toward coincidence.

Thus during the spin-up period, the rotor 48 will be aligned slowly to casing 49. The spin of the rotor will be accelerated according to the difference in the spins of the rotor and casing. Ultimately the two elements 48 and 49 rotate synchronously with each other and with the separating liquid 50, the inner element being centered equatorially and axially in the outer element by the centrifugal action of the liquid and by the repulsion of the magnets.

The rotor 48 now spins completely free from disturbing couples, so long as the casing 49 is aligned therewith. This condition is assured by the servomotor system, for if alignment is not perfect, the light beam reflected by mirror 59 will fall asymmetrically on the photocell detector 62 and the servomotors will move casing 49 in the gimbal system to restore alignment.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A gyroscope comprising a floatable rotor, a spherical vessel surrounding said rotor and spaced therefrom, a liquid filling said space and having a density rendering said rotor buoyant therein, a pair of trunnions secured to polar positions on said vessel to effect rotation thereof, at least one of said trunnions being of hollow construction, a mirror attached to said rotor at a polar position thereon visible through said hollow trunnion, means to direct a light beam axially through said hollow trunnion to impinge on said mirror and photosensitive detector means responsive to reflected rays from said mirror to produce a signal whose phase and amplitude depends on the axial position of said rotor relative to said vessel.

2. A gyroscope, as set forth in claim 1, wherein said detector means is constituted by quadrantal photosensitive elements coaxially disposed relative to said hollow trunnion.

3. A gyroscope comprising a floatable rotor, a spherical vessel surrounding said rotor and spaced therefrom, a liquid filling said space and having a density rendering said rotor buoyant therein, means supporting said vessel for rotation within a frame, a pivotally mounted gimbal, means pivotally mounting said frame within said gimbal, said frame and gimbal oscillating about mutually perpendicular axes, first and second servo motors for adjusting the respective angular positions of said frame and said gimbal, means to detect the angular position of said rotor axis relative to the vessel and to produce first and second signals whose phase and magnitude is a function of said displacement in mutually perpendicular directions, and means to apply said first and second signals to said first and second motors respectively to restore said vessel to axial alignment with said rotor.

4. A free gyroscope comprising first and second gyrospheres each including a floatable rotor surrounded by a vessel filled with a liquid having a density rendering said rotor buoyant, a frame, means rotatably mounting said gyrospheres within said frame about mutually perpendicular axes, inner and outer gimbals, said frame being pivotally mounted within said inner gimbal which in turn is pivotally mounted within said outer gimbal.

5. A free gyroscope, as set forth in claim 4, including a common motor supported within said frame and arranged to drive the vessels of said first and second gyrospheres simultaneously.

6. A free gyroscope comprising first and second gyrospheres each including a floatable rotor surrounded by a vessel filled with a liquid having a density rendering said rotor buoyant, a frame, means rotatably mounting said gyrospheres within said frame about mutually perpendicular axes, inner and outer gimbals, said frame being pivotally mounted within said inner gimbal which in turn is pivotally mounted within said outer gimbal, first, second and third servo motors coupled to said frame and said inner and outer gimbals respectively for adjusting the angular positions thereof, means responsive to the angular departure of the rotor axis in said first gyrosphere relative to the vessel thereof to control said first and second motors in a direction and to an extent restoring axial alignment, and means responsive to the angular departure of the rotor axis in said second gyrosphere relative to the vessel thereof to control said third motor in a direction and to an extent restoring axial alignment.

References Cited in the file of this patent

UNITED STATES PATENTS

| 1,864,801 | Chaplin | June 28, 1932 |
|---|---|---|
| 1,890,831 | Smyth | Dec. 13, 1932 |
| 2,534,824 | Jones | Dec. 19, 1950 |
| 2,613,538 | Edelstein | Oct. 14, 1952 |
| 2,725,750 | Togstad | Dec. 6, 1955 |